Patented Oct. 11, 1949

2,484,595

UNITED STATES PATENT OFFICE 2,484,595

SYNTHETIC ELASTIC AND ELASTOMERIC PRODUCTS

Murray M. Sprung, Schenectady, N. Y., assignor to General Electric Company, a corporation of New York No Drawing. Application January 16, 1947, Serial No. 722,457

12 Claims. (Cl. 260—37)

This invention is concerned with novel synthetic elastic and elastomeric products and methods of preparing the same. More particularly, this invention relates to a synthetic elastic product containing as an elastic element thereof an elastic polymer of an organo-substituted polysiloxane whose organic substituents consist essentially of lower alkyl and phenyl radicals attached to silicon through carbon-silicon linkages, the said radicals being present in the form of the recurring structural units corresponding to the formulas $(C_6H_5)_2SiO$ and $R_2SiO$, where R is a lower alkyl radical.

In Agens application Serial No. 526,473 (now U. S. Patent 2,448,756, issued September 7, 1948), filed March 14, 1944, and assigned to the same assignee as the present invention, there is disclosed and claimed synthetic compositions comprising an elastic polymer of a dimethyl silicone in which substantially all the silicon atoms are each connected to two methyl groups, i. e., the condensation products of the claimed invention contain an average of approximately two methyl groups per silicon atom. These polymeric materials, which exhibit all the physical characteristics of known natural and synthetic rubbers or elastic gums, for instance, elasticity, compressibility, good tensile strength, etc., possess, in addition to the foregoing properties, additional properties unobtainable with prior rubbers or elastomers prepared synthetically or derived from natural sources.

For example, the products disclosed and claimed in the aforementioned Agens application can be elongated and stretched in the same manner as known elastic or elastomeric products, and, in addition, are characterized by their flexibility at low temperatures (—60° C.) and particularly by their heat resistance. They have been found to retain their desirable rubber-like properties when heated for long periods of time at elevated temperatures of from 150° to 200° C. These elastic polymeric silicones or elastic gums may be compounded with various fillers and catalysts, and vulcanized under the influence of heat and pressure to yield synthetic elastomers or elastomeric products having improved extensibility and tensile strength over that possessed by the unfilled, unvulcanized elastic product.

Moreover, under the influence of heat and pressure, and in the presence of certain catalysts or vulcanization accelerators, the filled (or unfilled) elastic product may be converted to the infusible and insoluble state. More specific directions for the preparation of these synthetic elastic products and the synthetic elastomeric compositions therefrom, i. e., the vulcanized products, as well as the properties and structural constitution of these polymeric organo-siloxanes, may be found in the previously mentioned Agens application and in the applications of Marsden and Roedel, Serial No. 598,913, filed June 11, 1945 (now U. S. Patent 2,469,883, issued May 10, 1949), and Serial No. 549,128 (now U. S. Patent 2,436,220, issued February 17, 1948), filed August 11, 1944, in Marsden application Serial No. 676,105, filed June 11, 1946, and in Sprung application Serial No. 676,091, filed June 11, 1946 (now U. S. Patent 2,472,629, issued June 7, 1949), all the foregoing applications having been assigned to the same assignee as the instant application.

The synthetic compositions embraced by my invention differ from those disclosed and claimed in the aforementioned Agens application in that in addition to the presence of the repetitive structural unit $R_2SiO$, where R is a lower alkyl group, more specifically, a methyl group, my claimed compositions also contain the recurring or repetitive structural unit $(C_6H_5)_2SiO$. The presence of the latter recurring structural unit increases the heat resistance, chemical stability, and resiliency of the products molded from the claimed compositions, and also maintains the flexibility of such products over longer periods of time. The structure of my claimed compositions may be more clearly understood if their structure is considered as a polysiloxane chain in which the unit structures

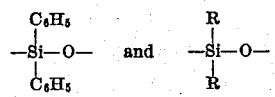

occur in a random or regular distribution with regard to each other, R being a lower alkyl group.

The synthetic elastic products with which my invention is concerned and which may be employed in the preparation of the synthetic elastomers may be prepared in several ways. One method comprises hydrolyzing a mixture comprising (1) a pure or substantially pure diphenyl dihalogenosilane, for example, diphenyl dichlorosilane, or an equivalent phenyl-substituted silane, for instance, diphenyl diethoxy silane, or a silane containing two phenyl groups and two hydrolyzable groups connected to the silicon atom and (2) a pure or substantially pure dimethyl dihalogenosilane, for example, dimethyl dichlorosilane, or an equivalent methyl-substituted silane, for instance, dimethyl diethoxy silane, or a silane containing two methyl groups and two hydrolyzable groups connected to the silicon atom.

A more complete description of the nature of the methyl- and phenyl-substituted polysiloxane used in practicing the present invention may best be obtained by reference to their preparation. In the preparation of methyl halogenosilanes (methylsilicon halides) according to the direct synthesis of that disclosed and claimed in Rochow Patent 2,380,995, issued August 7, 1945, and assigned to the same assignee as the present invention, for example, there is obtained a mixture of methyl halogenosilanes of the formula $(CH_3)_aSiX_{4-a}$ wherein X is a halogen atom and $a$ is a number equal to 1, 2 or 3. By fractional distillation the different compounds may be isolated in a substantially pure state, the degree of purity depending on the nature of the substituent X as well as on the efficiency of the distillation apparatus. For example, in the fractional distillation of a methyl chlorosilane mixture, dimethyl dichlorosilane is obtained at a temperature of about 70° C. at 760 millimeters. As is the case in most distillation processes, the dimethyl dichlorosilane is not absolutely pure but ordinarily contains some methyl trichlorosilane which boils at about 66° C. For the purposes of the present invention, I can use a dimethyl dichlorosilane fraction containing less than 2 mol per cent of methyl trichlorosilane, the optimum upper range of methyl trichlorosilane being less than 0.5 mol per cent.

The other halogenosilane, for example, diphenyl dichlorosilane, which is employed in the preparation of my claimed elastic gums or compositions, may also be prepared in accordance with the aforementioned Rochow patent (supra) by effecting reaction between heated silicon and chlorobenzene in the presence of a catalyst for the reaction, e. g., silver.

In the preparation of the elastic polymers of the claimed methyl- and phenyl-substituted polysiloxanes, the dimethyl dichlorosilane is preferably cohydrolyzed with the diphenyl dichlorosilane to facilitate ease in handling the hydrolysis product. However, it is within the scope of this invention to hydrolyze the individual constituents separately and mix the resulting liquid oily hydrolysis products together. Thereafter, the cohydrolysis product is contacted with a minor proportion, preferably from approximately 0.5 to 5 per cent, by weight (based on the weight of the cohydrolysis product), of a condensation catalyst or elasticizing agent capable of converting the liquid oily hydrolysis product to the elastic gum stage. Among the elasticizing agents which may be employed for this purpose are ferric chloride; alkali-metal hydroxides, e. g., sodium hydroxide, potassium hydroxide, etc.; sulfuric acid; chlorosulfonic acid; phosphorus oxychloride ($POCl_3$); phenyl phosphoryl chloride ($C_6H_5OPOCl_2$); dimethyl dichlorosilane, etc. I prefer to use phenyl phosphoryl chloride as the elasticizing agent, the use of such agent being more specifically disclosed and claimed in the aforementioned Sprung application (supra).

The transformation of the liquid oily hydrolysis products to elastic gums (and thereafter to heat-converted synthetic elastomers) is believed to be due to a rearrangement of the repetitive units, for example, $(CH_3)_2SiO$ and $(C_6H_5)_2SiO$, of the siloxane polymers into polymers of extremely high molecular weight which may best be described as elastic gums or solids having springy or elastic recovery characteristics and being capable of recovering size and shape after deformation. This transformation may be accomplished in a number of ways, for instance, by the use of the elasticizing agents previously mentioned. The conversion of the liquid hydrolysis products to the elastic gum stage by the elasticizing agents may be effected under the influence of heat, e. g., at temperatures of the order of from 50° to 125° C. However, it is preferable merely to incorporate the elasticizing agent in the liquid hydrolysis product and allow the mixture to stand at room temperature for the varying lengths of time required to yield the above-described elastic gums or compositions.

In order to prepare synthetic elastomeric compositions from the elastic gum, the latter is worked on ordinary mixing or differential rolls used in milling rubber until it attains the desired consistency for molding or extruding. Curing catalysts or vulcanizing agents (e. g., from about 1 to 5 per cent, by weight) and fillers may be added during this operation. After being formed into the desired shape in molds under the influence of heat and pressure, the synthetic elastomers may be further cured or vulcanized by further heat-treating in an oven until the desired degree of cure is obtained.

Hydrolysis of the mixture of chlorosilanes comprising dimethyl dichlorosilane and diphenyl dichlorosilane may be effected in several ways. One method comprises effecting the cohydrolysis in water alone or in water containing minor proportions of, for instance, hydrochloric acid, sodium carbonate, etc. It is sometimes desirable that the cohydrolysis be effected in a solvent medium comprising e. g., water and a solvent for the hydrolysis product, for instance, hydrocarbon solvents, e. g., toluene, xylene, etc., and aliphatic alcohols, for example, n-butanol, tertiary amyl alcohol, tertiary butyl alcohol, etc.

Because of the fact that, under certain conditions, solid matter may separate from the cohydrolysis product of dimethyl dichlorosilane and diphenyl dichlorosilane when hydrolysis is effected in the absence of a solvent, it is desirable that the molar proportions of the former chlorosilane to the latter chlorosilane be within certain ranges. Thus, I have found that there is less difficulty in cohydrolyzing the dimethyl dichlorosilane with the diphenyl dichlorosilane if the mixture of chlorosilanes contains, by weight, at least 60 mol per cent of the former, preferably 70 mol per cent. Good results are obtained if the molar proportions of the aforementioned chlorosilanes comprise, by weight, from about 3 to 30 mol per cent diphenyl dichlorosilane and from approximately 97 to 70 mol per cent dimethyl dichlorosilane. If any solids do separate out from the cohydrolysis product, a homogeneous liquid may be obtained by heating the solid material with the liquid oily hydrolysis products. In general, better physical properties are obtained where the recurring structural unit $(C_6H_5)_2SiO$ is present in an amount equal to less than 50 mol per cent, preferably less than 30 mol per cent.

In order that those skilled in the art may better understand how my claimed compositions may best be prepared, the following examples are given by way of illustration and not by way of limitation. All parts are by weight.

EXAMPLE 1

Dimethyl dichlorosilane and diphenyl dichlorosilane, in varying molar proportions, were cohydrolyzed by slowly pouring the respective mixtures into water. The hydrolysis products were each treated with about 0.5 per cent, by weight, of phenyl phosphoryl chloride, and each treated sample was allowed to stand about 20 days at about 25° C., after which time it was converted to a soft, solid, elastic gum. About 100 parts of each elastic sample was thereafter milled on differential rubber rolls with 200 parts titanium dioxide; 10 parts lead monoxide; and 2.5 parts benzoyl peroxide. The rubber-like sheets obtained were pressed in a closed mold for 10 minutes at 140° C. under a pressure of about 1000 p. s. i., and then heat-treated in a 150° C. oven for about 18 hours. The following tables show the compositions of the mixtures of chlorosilanes and the properties of the heat-treated elastomers, i. e., the cured or vulcanized molded samples.

TABLE I

| Sample No. | Dimethyl Dichlorosilane | | Diphenyl Dichlorosilane | | Product Obtained | |
|---|---|---|---|---|---|---|
| | Parts | Mols | Parts | Mols | Parts Oil | Parts Solids |
| A | 245.1 | 1.9 | 25.3 | 0.1 | 136 | None |
| B | 232.2 | 1.8 | 50.6 | 0.2 | 144 | [1] 8 |

[1] The solid material which separated out in this sample was recombined with the liquid oily hydrolysis product and the mixture heated at 60° C. until a homogeneous solution was obtained.

TABLE II

| Sample No. | Tensile Strength, p. s. i. | Per Cent Elongation At Break | Hardness | |
|---|---|---|---|---|
| | | | Scleriscope | Shore |
| A | 570 | 100 | 58 | 52 |
| B | 575 | 100 | 42 | 54 |

EXAMPLE 2

In this example, dimethyl dichlorosilane and diphenyl dichlorosilane were cohydrolyzed in varying molar proportions similarly as was done in Example 1, and the hydrolysis products were mixed with about 1 per cent, by weight, of phosphorus oxychloride as the elasticizing agent. Each mixture was allowed to stand at room temperatures for the stated number of days to yield a solid, elastic gum or composition. Each elastic gum was compounded with titanium dioxide, lead monoxide, and benzoyl peroxide in the same proportions and in the same manner as was done in Example 1. The samples were then molded at 150° C. for about 10 minutes at a pressure of approximately 1000 p. s. i. The various samples were heat-treated at different temperatures and for varying lengths of time to determine the effect of such treatment on the physical properties of the samples. The following tables show the manner of preparation and the physical properties of the various samples.

TABLE III

| Sample No. | Mol Per Cent Diphenyl Dichlorosilane | Mol Per Cent Dimethyl Dichlorosilane | Catalyst | Days [1] At Room Temperature |
|---|---|---|---|---|
| C | 5 | 95 | $POCl_3$ | 7 |
| D | 10 | 90 | do | 8 |
| E | 20 | 80 | do | 5 |

[1] Days required to convert the liquid oily hydrolysis product to the elastic gum stage.

NOTE.—Wherever any solid material (probably diphenyl silicol) separated from the liquid hydrolysis product, it was recombined and redissolved in the liquid hydrolysis product by heating the two phases at 70° to 100° C. until homogeneity was obtained.

TABLE IV

*Physical properties of methyl- and phenyl-substituted polysiloxane elastomers*

| Sample No. | Cure Time, Hours | Temp., °C. | Tensile Strength, p. s. i. | Per Cent Elongation | Shore Hardness |
|---|---|---|---|---|---|
| C | | | 215 | 250 | 36 |
| C | 2 | 150 | 560 | 150 | 44 |
| C | 6 | 150 | 700 | 100 | 58 |
| C | 18 | 150 | 600 | 100 | 58 |
| D | 3 | 150 | 470 | 100 | 57 |
| D | 6 | 150 | 415 | 100 | 58 |
| D | 10 | 150 | 555 | 100 | 50 |
| D | 18 | 150 | 550 | 100 | 58 |
| E | 5 | 150 | 365 | 100 | |
| E | 10 | 150 | 390 | 150 | 46 |

*Example 3*

Diphenyl dichlorosilane and dimethyl dichlorosilane were cohydrolyzed employing the two chlorosilanes in the molar proportions, by weight, of 25 mol per cent diphenyl dichlorosilane and 75 mol per cent dimethyl dichlorosilane (sample F), and 50 mol per cent of each component in the case of sample G. About 1 per cent, by weight, chlorosulfonic acid was added to the cohydrolysis product of sample F, and approximately 1 per cent phosphorus oxychloride was added to the cohydrolysis product of sample G. The two mixtures were allowed to stand at room temperature for about 16 to 17 days, after which time a solid elastic gum or composition was obtained in each case. The samples were compounded with titanium dioxide, lead monoxide, and benzoyl peroxide in the same proportions as in Example 1. The resulting sheet obtained in the case of sample F was heated at 100° C. for 40 hours, and in the case of sample G was heated at 100° C. for 15 hours, at 125° C. for 2 hours, and at 175° C. for 15 minutes. The filled elastic compositions were molded under the same conditions as disclosed in Example 1. The molded samples were heat-cured at 150° C. for 18 hours to yield soft, elastomeric, infusible, and insoluble products having a good degree of strength and elongation. The molded and heat-treated samples were softer than the samples obtained in the case of those molded in Example 2.

It will be apparent to those skilled in the art that fillers other than those employed in the foregoing examples may be used. These include, e. g., ferric oxide, antimony oxide, asbestos in various forms, for example, asbestos floats, asbestos fibers, etc., comminuted glass fibers, whiting, lithopone, talc, zinc oxide, powdered silica, and the other finely divided solid materials used as fillers for natural and snythetic rubbers. Further information as to methods and procedures for hydrolyzing the chlorosilanes or mixtures of chlorosilanes, for converting the hydrolysis products to the elastic gum stage, and for compounding and molding the elastic filled or unfilled compositions may be found in the aforementioned Agens application.

The novel methyl- and phenyl-substituted synthetic elastic polysiloxane compositions and synthetic elastomers prepared therefrom, as disclosed and claimed in my invention, are useful in applications where materials having rubber-like properties are required, such as gaskets, electrical insulation (for example, conductor insulation), shock absorbers, etc. Owing to their resistance to deterioration at high temperatures and their resistance to embrittlement at low temperatures, they are particularly useful in applications where natural rubbers or other synthetic rubbers fail, owing to the deleterious effect of heat or cold.

What I claim as new and desire to secure by Letters Patent of the United States is:

1. A heat-curable synthetic elastic product containing as an elastic element thereof a solid, elastic, curable methyl- and phenylpolysiloxane consisting of methyl radicals, phenyl radicals, and silicon and oxygen atoms, and containing an average of from 1.98 to 2.00 total methyl and phenyl radicals per silicon atom, said solid polysiloxane having been obtained by condensing a liquid consisting of polymeric dimethyldisiloxane containing up to 2 mol per cent copolymerized monomethylsiloxane and from 3 to 30 mol per cent copolymerized diphenylsiloxane.

2. An elastomeric product comprising the cured product of claim 1.

3. A new composition of matter comprising essentially the solid, elastic, curable product of reaction of ingredients including (1) a liquid polysiloxane consisting of methyl and phenyl radicals, and silicon and oxygen atoms, and containing an average of from 1.98 to 2.00 total methyl and phenyl groups per silicon atom, the said liquid polysiloxane consisting of polymeric dimeethylsiloxane containing up to 2 mol per cent copolymerized monomethylsiloxane and from 3 to 30 mol per cent copolymerized diphenylsiloxane, and (2) a condensing agent for (1).

4. A new composition of matter comprising essentially the solid, elastic product of reaction of ingredients including (1) a liquid product of cohydrolysis of (a) dimethyldichlorosilane containing up to 2 mol per cent methyltrichlorosilane and (b) from 3 to 30 mol per cent diphenyldichlorosilane, the said elastic product containing an average of from 1.98 to 2.00 total methyl and phenyl groups per silicon atom, and (2) a condensing agent.

5. A composition of matter as in claim 4 wherein the condensing agent employed is phenyl phosphoryl chloride.

6. A solid, elastic product obtained as in claim 4 wherein the condensing agent is phenyl phosphoryl chloride present in an amount equal to from 0.5 to 5 per cent, by weight, of the isolated cohydrolysis product.

7. The process of making a new synthetic solid, elastic, curable product which comprises contacting (1) a liquid methyl- and phenylpolysiloxane containing an average of from 1.98 to 2.00 total methyl and phenyl groups per silicon atom and consisting of polymeric dimethylsiloxane containing up to 2 mol per cent copolymerized monomethylsiloxane and from 3 to 30 mol per cent copolymerized diphenylsiloxane, with (2) a condensing agent until a solid, elastic product is obtained.

8. The process as in claim 7 wherein the condensing agent is phenyl phosphoryl chloride.

9. The process of making a synthetic elastomeric composition which comprises (1) treating with a condensing agent, until a solid, elastic, curable product is obtained, a liquid methyl- and phenylpolysiloxane containing an average of from 1.98 to 2.00 total methyl and phenyl groups per silicon atom and consisting of polymeric dimethylsiloxane containing up to 2 mol per cent copolymerized monomethylsiloxane and from 3 to 30 mol per cent copolymerized diphenylsiloxane, (2) compounding the said material with a filler, and (3) advancing the cure of the filled material under heat.

10. The process of making a synthetic elastomeric composition which comprises (1) treating with from 0.5 to 5 per cent, by weight, phenyl phosphoryl chloride, a liquid methyl- and phenylpolysiloxane containing from 1.98 to 2.00 total methyl and phenyl groups per silicon atom and consisting of polymeric dimethylsiloxane containing up to 2 mol per cent copolymerized monomethylsiloxane and from 3 to 30 mol per cent copolymerized diphenylsiloxane, the said treatment being maintained until a heat-curable, solid, elastic material is obtained, (2) compounding the said material with a filler comprising titanium dioxide and a small amount of benzoyl peroxide sufficient to cure the said compounded material, and (3) heating the resulting composition, thereby to obtain a cured elastomeric material.

11. The process which comprises hydrolyzing a mixture of halogenosilanes comprising (a) dimethyldihalogenosilane containing up to 2 mol per cent methyltrihalogenosilane and (b) from 3 to 30 mol per cent diphenyldihalogenosilane, the said hydrolysis product containing an average of from 1.98 to 2.00 total methyl and phenyl groups per silicon atom, and treating the isolated oily hydrolysis product with a condensing agent until a solid, elastic product is obtained.

12. The process as in claim 11 wherein the condensing agent is phenyl phosphoryl chloride present in an amount equal to from 0.5 to 5 per cent, by weight, based on the weight of the oily hydrolysis product.

MURRAY M. SPRUNG.

REFERENCES CITED

The following references are of record in the file of this patent:

UNITED STATES PATENTS

| Number | Name | Date |
|---|---|---|
| 2,258,222 | Rochow | Oct. 7, 1941 |
| 2,386,466 | Hyde | Oct. 9, 1945 |
| 2,383,827 | Sprung | Aug. 28, 1945 |
| 2,389,802 | McGregor | Nov. 27, 1945 |
| 2,392,713 | Wright | Jan. 8, 1946 |
| 2,460,795 | Warrick | Feb. 1, 1949 |

FOREIGN PATENTS

| Number | Country | Date |
|---|---|---|
| 583,875 | Great Britain | Jan. 1, 1947 |
| 583,878 | Great Britain | Jan. 1, 1947 |